(12) United States Patent
Mills et al.

(10) Patent No.: US 11,802,546 B2
(45) Date of Patent: Oct. 31, 2023

(54) PLENUM RESIDENT WIND TURBINE SUSTAINABLE ENERGY GENERATING SYSTEM

(71) Applicant: CentraVent, LLC, Cameron Park, CA (US)

(72) Inventors: Kirk Mills, Cameron Park, CA (US); Kimberley Mills, Cameron Park, CA (US)

( * ) Notice: Subject to any disclaimer, the term of this patent is extended or adjusted under 35 U.S.C. 154(b) by 0 days.

(21) Appl. No.: 18/108,588

(22) Filed: Feb. 11, 2023

(65) Prior Publication Data
US 2023/0204012 A1 Jun. 29, 2023

Related U.S. Application Data

(63) Continuation of application No. 17/467,241, filed on Sep. 5, 2021, now Pat. No. 11,585,324.

(60) Provisional application No. 63/075,267, filed on Sep. 7, 2020.

(51) Int. Cl.
| | |
|---|---|
| *F03D 9/43* | (2016.01) |
| *F03D 9/25* | (2016.01) |
| *F03D 3/02* | (2006.01) |
| *F03D 3/00* | (2006.01) |

(52) U.S. Cl.
CPC .............. *F03D 9/43* (2016.05); *F03D 3/002* (2013.01); *F03D 3/005* (2013.01); *F03D 3/02* (2013.01); *F03D 9/25* (2016.05); *F05B 2220/7066* (2013.01); *F05B 2240/911* (2013.01)

(58) Field of Classification Search
CPC . F03D 3/002; F03D 3/005; F03D 3/02; F05B 2240/911
USPC ...................................................... 290/44, 55
See application file for complete search history.

(56) References Cited

U.S. PATENT DOCUMENTS

| | | |
|---|---|---|
| 7,878,236 B1 | 2/2011 | Breen |
| 8,562,283 B2 | 10/2013 | Hopkins |
| 8,564,148 B1 | 10/2013 | Novak |
| 8,759,997 B2 | 6/2014 | Gilbert |
| 2008/0188174 A1 | 8/2008 | Aminpour |
| 2010/0183380 A1 | 7/2010 | Dietterich |
| 2012/0156034 A1 | 6/2012 | Sabannavar |
| 2014/0333072 A1 | 11/2014 | Smith |
| 2016/0084227 A1 | 3/2016 | Krippene |

*Primary Examiner* — Charles Reid, Jr.
(74) *Attorney, Agent, or Firm* — Inventive Law Inc.; Jim H. Salter

(57) ABSTRACT

A plenum resident wind turbine sustainable energy generating system is disclosed. An example embodiment includes: a wind turbine assembly installed in a plenum of a heating, ventilating, and air conditioning (HVAC) unit, the wind turbine assembly including a plurality of blades and a transverse shaft; and a generator coupled to the shaft of the wind turbine assembly.

20 Claims, 5 Drawing Sheets

A Method for Providing
A Plenum Resident Wind Turbine Sustainable Energy Generating System
-1000-

Install a wind turbine assembly in a plenum of a heating, ventilating, and air conditioning (HVAC) unit, the wind turbine assembly including a plurality of blades and a transverse shaft.
-1010-

Couple a generator to the shaft of the wind turbine assembly.
-1020-

Cause the HVAC unit to generate an air flow to the wind turbine assembly.
-1030-

End

Fig. 5

PLENUM RESIDENT WIND TURBINE SUSTAINABLE ENERGY GENERATING SYSTEM

PRIORITY PATENT APPLICATIONS

This non-provisional patent application is a continuation application drawing priority from U.S. non-provisional patent application Ser. No. 17/467,241; filed Sep. 5, 2021; which draws priority from U.S. provisional patent application Ser. No. 63/075,267; filed Sep. 7, 2020. This present non-provisional continuation patent application draws priority from the referenced patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure provided herein and to the drawings that form a part of this document: Copyright 2019-2023, Kirk and Kimberley Mills; All Rights Reserved.

TECHNICAL FIELD

The disclosed subject matter relates to the field of heating, cooling, and ventilating equipment for structures, wind turbine energy generating systems, and particularly although not exclusively, to a plenum resident wind turbine sustainable energy generating system.

BACKGROUND

Heating and cooling the space in residential and commercial buildings accounts for a primary share of building energy consumption. Existing buildings typically use an air conditioning system, a heating, ventilating, and air conditioning system (HVAC), or a whole house fan for cooling and ventilating residential and commercial building structures. A majority of buildings and homes have a central HVAC system and many have several such systems. In many cases, especially in commercial buildings, the HVAC systems are required to run constantly to prevent stagnant air pockets in buildings. Such HVAC systems typically have a blower motor that produces a constant cubic feet per minute (CFM) air flow rated for the tonnage or size of the equipment. The blower produces a constant pre-configured amount of air flow, and thus, the blower motor consumes a relatively constant, but persistent, rate of electrical power.

SUMMARY

According to various example embodiments of the disclosed subject matter as described herein, there is disclosed, illustrated, and claimed a plenum resident wind turbine sustainable energy generating system. The example embodiments disclosed herein provide an apparatus, system, and method implemented as a plenum resident wind turbine sustainable energy generating system. Example embodiments of the disclosed energy generation system provide one or more wind turbine assemblies installed in a plenum of a conventional HVAC system. The wind turbine assemblies are positioned to be plenum resident and within the flow of air produced by the HVAC blower. The air flow produced by the HVAC blower causes the wind turbine assemblies to turn at a relatively constant rate of speed. A transverse center axle or shaft of each wind turbine assembly can be directly coupled to an electrical generator or coupled to the generator via a gearbox or gear linkage. The gearbox can be used to adjust for the appropriate speed of the wind turbine assembly shaft relative to the shaft of the generator. As the wind turbine assembly is turned by the air flow produced by the HVAC blower, the generator also turns and generates electrical power, which can be fed to a downstream electrical load, such as a battery or a power grid. Because the HVAC blower is required to be constantly active, the one or more wind turbine assemblies always receive the relatively constant air flow from the HVAC blower. As a result, the plenum resident wind turbine sustainable energy generating system as described herein can leverage the air flow from the HVAC blower to produce sustainable electrical energy. Example embodiments are described in more detail below.

BRIEF DESCRIPTION OF THE DRAWINGS

Embodiments are illustrated by way of example and not limitation in the figures of the accompanying drawings, in which:

FIG. 5 illustrates a flow diagram representing a sequence of operations performed in a method according to an example embodiment.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed a plenum resident wind turbine sustainable energy generating system. The example embodiments disclosed herein provide an apparatus, system, and method implemented as a plenum resident wind turbine sustainable energy generating system. Example embodiments of the disclosed energy generation system provide one or more wind turbine assemblies installed in a plenum of a conventional HVAC system. The wind turbine assemblies are positioned to be plenum resident and within the flow of air produced by the HVAC blower. The air flow produced by the HVAC blower causes the wind turbine assemblies to turn at a relatively constant rate of speed. A transverse center axle or shaft of each wind turbine assembly can be directly coupled to an electrical generator or coupled to the generator via a gearbox or gear linkage. The gearbox can be used to adjust for the appropriate speed of the wind turbine assembly shaft relative to the shaft of the generator. As the wind turbine assembly is turned by the air flow produced by the HVAC blower, the generator also turns and generates electrical power, which can be fed to a downstream electrical load, such as a battery or a power grid. Because the HVAC blower is required to be constantly active, the one or more wind turbine assemblies always receive the relatively constant air flow from the HVAC blower. As a result, the plenum resident wind turbine sustainable energy generating system as described herein can leverage the air flow from the HVAC blower to produce sustainable electrical energy.

Figure 1:
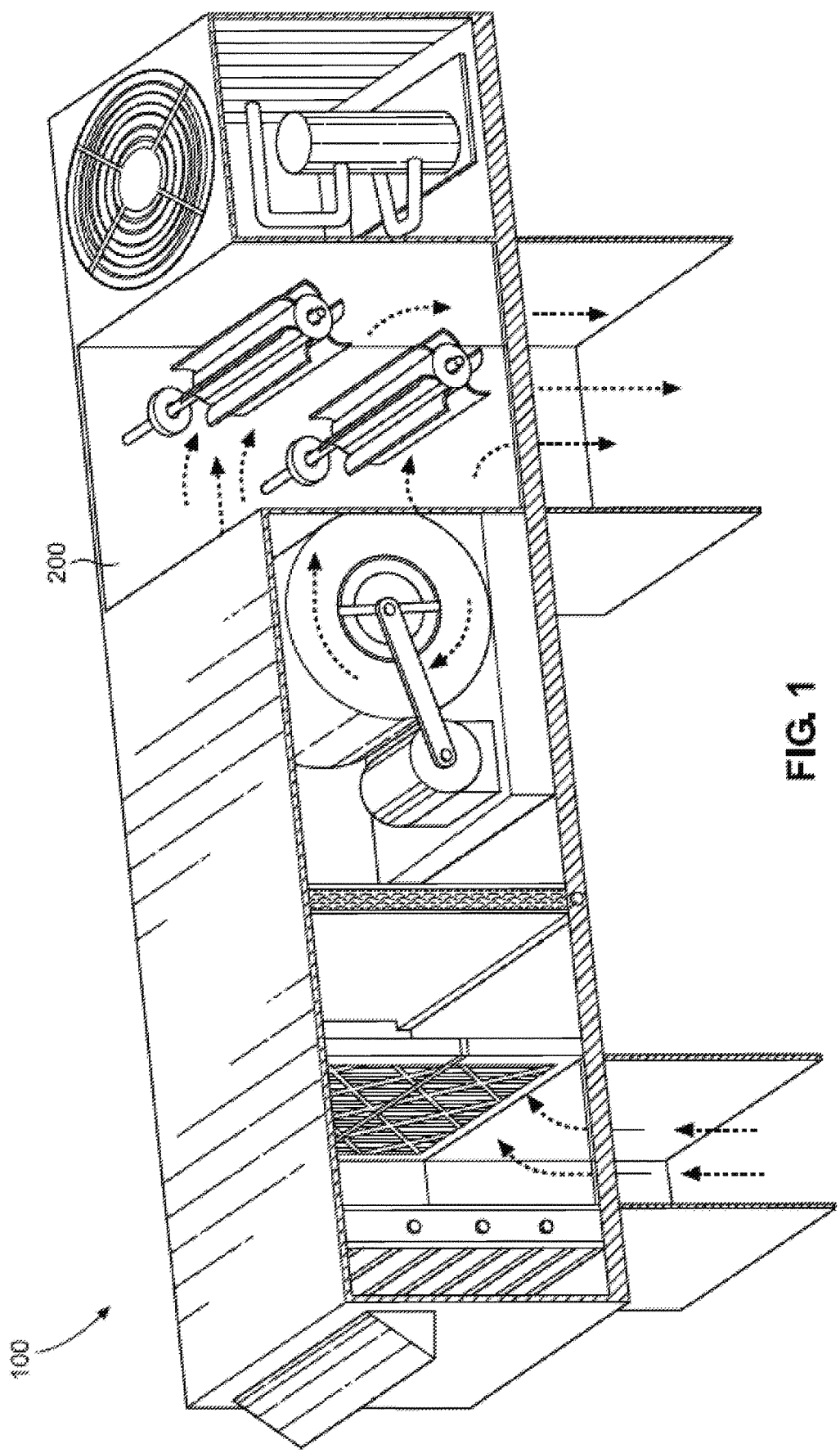
FIG. 1 illustrates an HVAC system in which an example embodiment of the plenum resident wind turbine sustainable energy generating system is installed.

FIG. 1 illustrates an HVAC system 100 in which an example embodiment of the plenum resident wind turbine sustainable energy generating system 200 is installed. Referring now to FIG. 1 in an example embodiment, the HVAC system 100 includes a plenum through which return air is received. An HVAC blower serves to move air from the return air intake duct, through the plenum, and out through an outflow duct provided in a supply chamber portion of the HVAC plenum. Because the HVAC blower will be constantly running at a relatively constant speed, a constant air flow at a constant rate is produced by the HVAC blower through the supply chamber portion of the HVAC plenum.

An example embodiment of the plenum resident wind turbine sustainable energy generating system 200 can be installed or placed into the supply or return chamber portion of the HVAC plenum to take advantage of the constant air flow produced by the HVAC blower. The energy generating system 200 can be attached to the interior surfaces of the supply chamber or placed into the supply or return chamber on a separate support structure. The details of the plenum resident wind turbine sustainable energy generating system 200 of an example embodiment are provided below.

Figure 2:
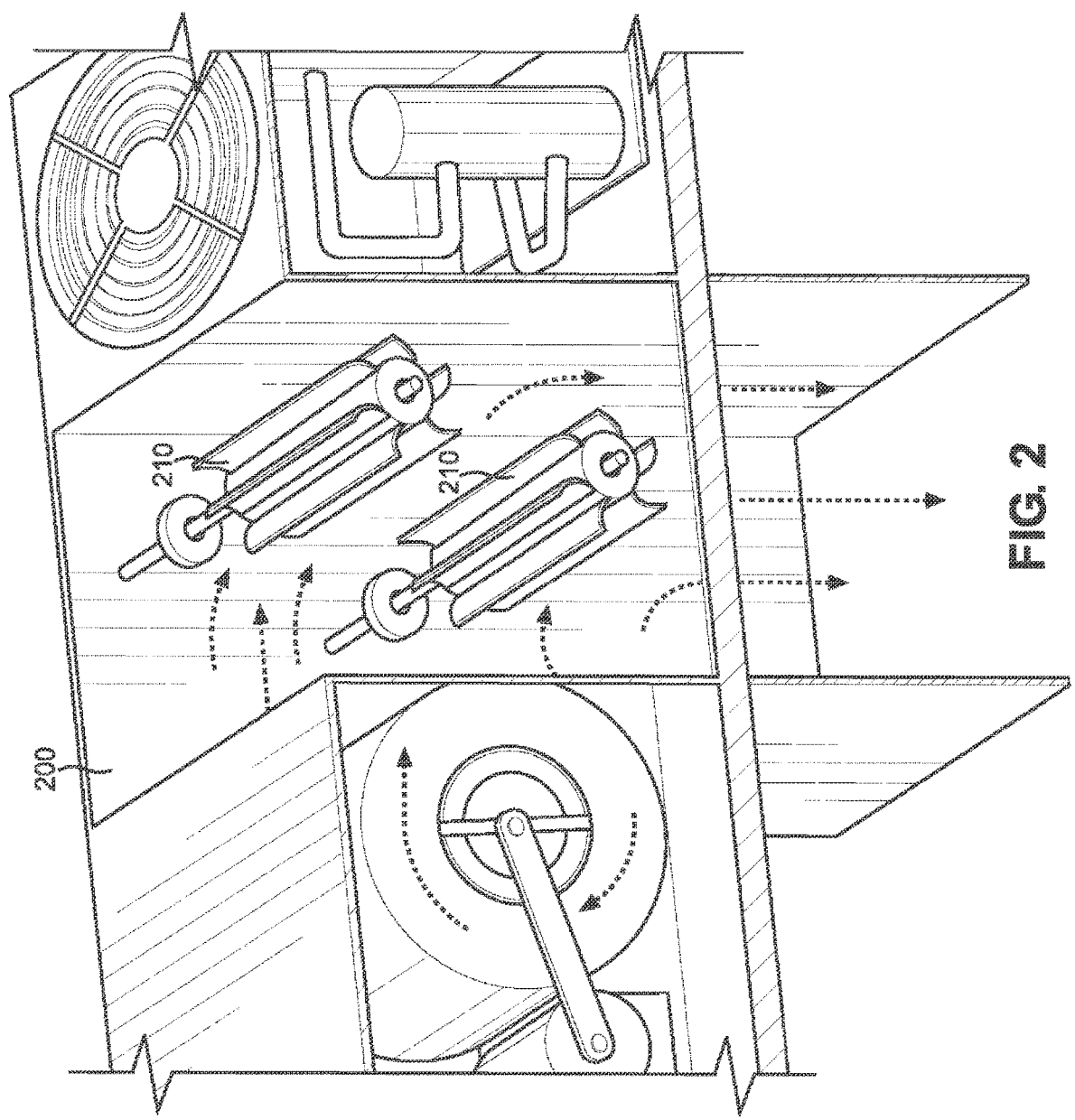
FIG. 2 illustrates a detail of an example embodiment of the plenum resident wind turbine sustainable energy generating system as installed in an HVAC system.

FIG. 2 illustrates a detail of an example embodiment of the plenum resident wind turbine sustainable energy generating system 200 as installed in an HVAC system 100. In an example embodiment, the plenum resident wind turbine sustainable energy generating system 200 can include one or more vertically and/or horizontally mounted wind turbine assemblies 210, each made from a rigid body (e.g., a light metal alloy, carbon fiber, or the like) and blades (e.g., aluminum, carbon fiber, plastic, or the like). Each of the wind turbines can be mounted on or integrated with a transverse shaft through the center of the wind turbine assembly 210 that spins as the wind turbine spins as a result of the air flow from the HVAC blower. Stators can also be provided on the shaft as stationary mounting points for the wind turbine assembly 210. As shown in FIG. 2, a plurality of these wind turbine assemblies 210 can be installed or placed into the supply chamber portion of the HVAC plenum. Each of the plurality of wind turbine assemblies 210 will spin as a result of the air flow from the HVAC blower.

Figure 3:
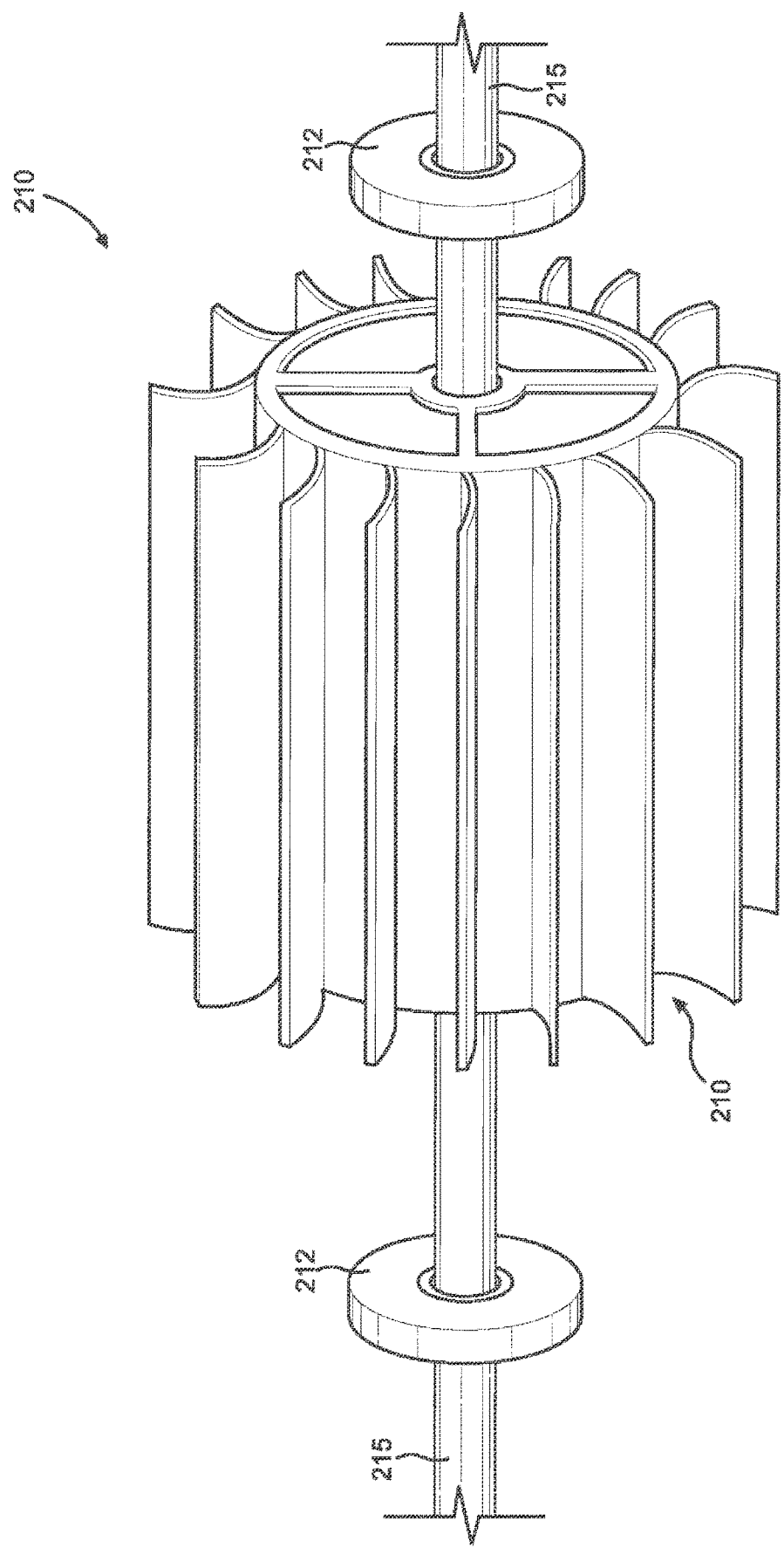
FIG. 3 illustrates a wind turbine assembly with a shaft and stators, which can be used in an example embodiment of the plenum resident wind turbine sustainable energy generating system as disclosed herein.

FIG. 3 illustrates a wind turbine assembly 210 with a shaft 215 with stators 212, which can be used in an example embodiment of the plenum resident wind turbine sustainable energy generating system 200 as disclosed herein. As described above, the plenum resident wind turbine sustainable energy generating system 200 can include one or more vertically and/or horizontally mounted wind turbine assemblies 210, each made from a rigid body (e.g., a light metal alloy, carbon fiber, or the like) and blades (e.g., aluminum, carbon fiber, plastic, or the like). Each of the wind turbines can be mounted on or integrated with a transverse shaft through the center of the wind turbine assembly 210 that spins as the wind turbine spins as a result of the air flow from the HVAC blower. Stators 212 can also be provided on the shaft as stationary mounting points for the wind turbine assembly 210.

Figure 4:
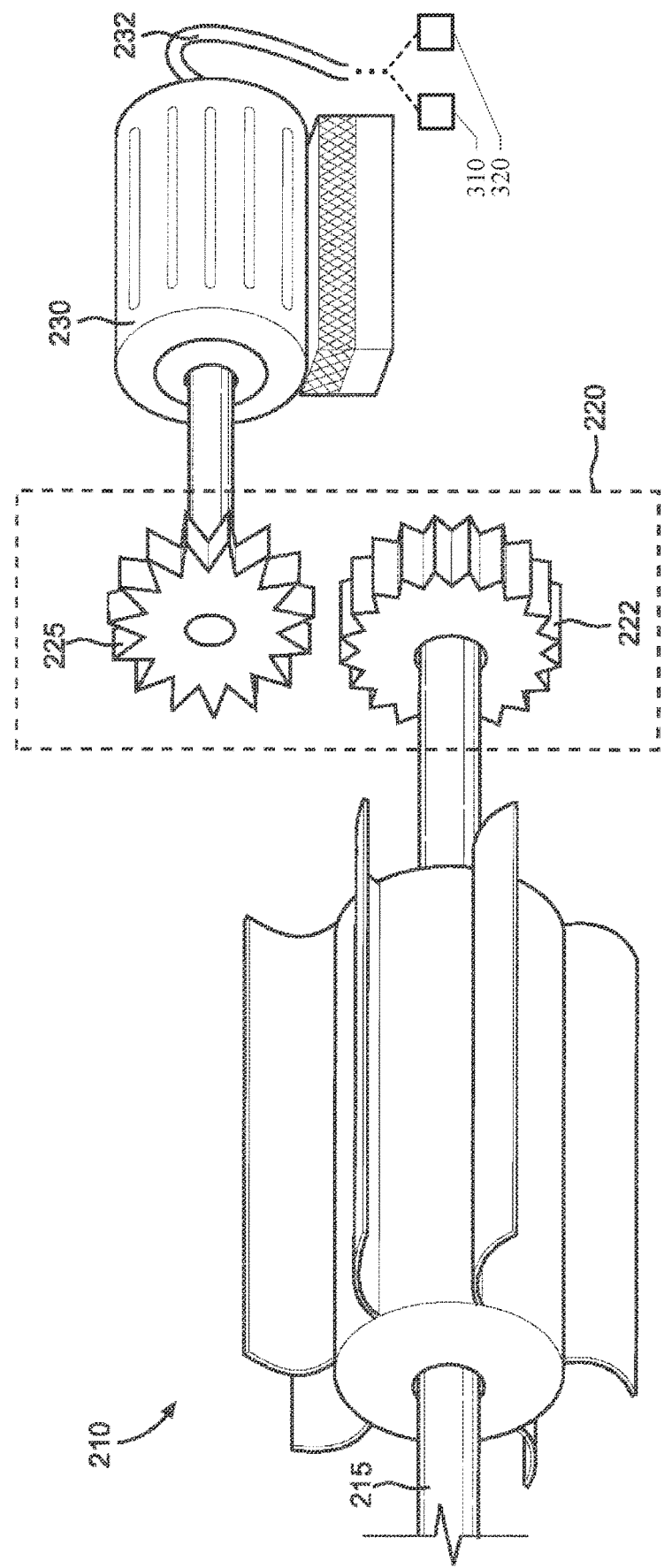
FIG. 4 illustrates a wind turbine assembly with a shaft as coupled with a gearbox and a generator in an example embodiment.

FIG. 4 illustrates a wind turbine assembly 210 with a transverse shaft 215 as coupled with a gearbox 220 and a generator 230 in an example embodiment. As described above, the wind turbine assembly 210 along with the transverse shaft 215 spins as the wind turbine spins as a result of the air flow from the HVAC blower. As shown in FIG. 4, an end of the transverse shaft 215 can be coupled to or integrated with a first gear 222 of gearbox 220. First gear 222 can be sized relative to the typical or average speed at which the transverse shaft 215 is expected to turn in normal operation. A second gear 225 can be in mechanical engagement with first gear 222. The spinning motion of the first gear 222 will cause a corresponding spinning of the second gear 225. As shown in FIG. 4, the second gear 225 can be coupled to or integrated with a shaft of the generator 230. The spinning motion of the second gear 225 will cause a corresponding spinning of the shaft of the generator 230, which will cause the generation of electrical energy on wires 232. Second gear 225 can be sized relative to the typical or average speed at which the generator 230 is most efficient in normal operation. Typically, the first gear 222 and the second gear 225 are of different sizes. As a result of the structure and coupling of the wind turbine assembly 210, the gearbox 220, and the generator 230 in an example embodiment as shown in FIG. 4, the spinning motion of the wind turbine assembly 210 caused by the HVAC blower will cause a spinning of the first gear 222 of gearbox 220, which will cause a corresponding spinning of the second gear 225 of gearbox 220, which will cause a corresponding spinning of the shaft of the generator 230, which will cause the generation of electrical energy on wires 232. The electrical energy output from the generator 230 on wires 232 can be coupled and fed to a downstream electrical load, such as a battery 310 or a power grid. Thus, the example embodiments of the plenum resident wind turbine sustainable energy generating system 200 can convert air flow from an HVAC blower into a source of sustainable electrical energy.

FIG. 5 illustrates a flow diagram representing a sequence of operations performed in a method according to an example embodiment. In accordance with the example method 1000, the method comprises: installing a wind turbine assembly in a plenum of a heating, ventilating, and air conditioning (HVAC) unit, the wind turbine assembly including a plurality of blades and a transverse shaft (operation 1010); coupling a generator to the shaft of the wind turbine assembly (operation 1020); and causing the HVAC unit to generate an air flow to the wind turbine assembly (operation 1030).

The example embodiments of the plenum resident wind turbine sustainable energy generating system 200 as disclosed herein can provide cylindrical wind turbines that will fit into blower HVAC plenums. The wind turbines can spin at pre-configured speeds based on a cubic feet per minute (CFM) air flow speed determined by the size of HVAC equipment. The plenum resident wind turbine sustainable energy generating system 200 as disclosed herein can produce electrical energy in kilowatts (KW) through the generator 230, which can be converted to useable AC power and transferred back to the electrical grid. The example embodiments as disclosed herein can provide a new wind turbine assembly designed for a constant air flow and configured to fit in a confined space, such as an HVAC plenum. Example embodiments of the plenum resident wind turbine sustainable energy generating system 200 can be used in commercial buildings worldwide and can be used to help offset electrical costs of air conditioning these buildings. A dual power inverter can be used with 12 v-48 v batteries for power storage. Alternatively, a synchronized inverter 320 can transfer power to the electrical grid and enable an owner to receive credit from the utility company. In an example embodiment, the gearbox 220 can be installed to maximize the kinetic power from the shaft 215 on the low profile wind turbine assembly 210. The gearbox 220 attached to the wind turbine assembly 210 can be specifically designed for a constant CFM air flow. In an example embodiment, the gearbox 220 can be a step up gearbox, which will increase RPM of shaft gears, possibly up to a 90:1 ratio. This increase of RPMs will spin the shaft of the generator 230 with a fixed RPM and will produce the same amount of electrical power during unit operation. The amount of electrical power required by the system can be used to determine the size and quantity of wind turbine assemblies 210 to install. In example embodiments, HVAC equipment producing air flows at 12 mph and up to 80 mph can spin multiple wind turbine assemblies 210 located in an HVAC plenum. Depending on the size of the HVAC equipment and the quantity of wind turbine assemblies 210 installed inside of the HVAC unit, it is possible to completely offset the operational costs of running the HVAC units. The plenum resident wind turbine sustainable energy generating system 200 of example embodiments can use a constant cubic feet per minute (CFM) air flow and generate electrical power (KWH) from an airflow moving at 6 mph or more. Other embodiments can use air flows produced by the largest HVAC equipment that produces 300,000 CFM. Turbine blades can be designed to catch an optimum air flow at a high constant volume. Blades can also produce a small amount of CFM and may offset any potential blockage caused by the wind turbine assemblies.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a plenum resident wind turbine sustainable energy generating system is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A plenum resident wind turbine sustainable energy generating system comprising:
a wind turbine assembly for installation within a plenum of a heating, ventilating, and air conditioning (HVAC) unit, the wind turbine assembly including a plurality of blades and a transverse shaft for installation lengthwise perpendicularly to a flow of air within the plenum; and
a generator having a generator shaft separate from the transverse shaft of the wind turbine assembly, the transverse shaft of the wind turbine assembly being in mechanical engagement with the generator shaft, the generator further including electrical wires for coupling to a battery or a power grid.

2. The plenum resident wind turbine sustainable energy generating system of claim 1 wherein the transverse shaft of the wind turbine assembly being in mechanical engagement with the generator shaft via a plurality of gears of a gearbox.

3. The plenum resident wind turbine sustainable energy generating system of claim 2 wherein the plurality of gears of the gearbox are of different sizes.

4. The plenum resident wind turbine sustainable energy generating system of claim 2 wherein the gearbox is configured to spin the generator shaft at a fixed number of revolutions per minute (RPMs).

5. The plenum resident wind turbine sustainable energy generating system of claim 1 further including an inverter coupled to the electrical wires of the generator.

6. The plenum resident wind turbine sustainable energy generating system of claim 1 wherein the wind turbine sustainable energy generating system is installed or placed into a supply chamber portion of the HVAC plenum.

7. The plenum resident wind turbine sustainable energy generating system of claim 1 wherein the wind turbine sustainable energy generating system is installed or placed into a return chamber portion of the HVAC plenum.

8. The plenum resident wind turbine sustainable energy generating system of claim 1 including one or more vertically mounted wind turbine assemblies.

9. The plenum resident wind turbine sustainable energy generating system of claim 1 including one or more horizontally mounted wind turbine assemblies.

10. The plenum resident wind turbine sustainable energy generating system of claim 1 including a stator mountable to an interior surface of the plenum, the stator being in mechanical engagement with the transverse shaft of the wind turbine assembly.

11. A method for generating plenum resident wind turbine sustainable energy, the method comprising:
  installing a wind turbine assembly within a plenum of a heating, ventilating, and air conditioning (HVAC) unit, the wind turbine assembly including a plurality of blades and a transverse shaft;
  positioning the transverse shaft of the wind turbine assembly lengthwise perpendicularly to a flow of air within the plenum;
  installing a generator proximate to the HVAC plenum, the generator having a generator shaft separate from the transverse shaft of the wind turbine assembly;
  coupling the transverse shaft of the wind turbine assembly in mechanical engagement with the generator shaft;
  coupling electrical wires of the generator to a battery or a power grid; and
  causing the HVAC unit to generate an air flow to the wind turbine assembly.

12. The method of claim 11 wherein the transverse shaft of the wind turbine assembly being in mechanical engagement with the generator shaft via a plurality of gears of a gearbox.

13. The method of claim 12 wherein the plurality of gears of the gearbox are of different sizes.

14. The method of claim 12 wherein the gearbox is configured to spin the generator shaft at a fixed number of revolutions per minute (RPMs).

15. The method of claim 11 further including coupling an inverter to the electrical wires of the generator.

16. The method of claim 11 wherein the wind turbine sustainable energy generating system is installed or placed into a supply chamber portion of the HVAC plenum.

17. The method of claim 11 wherein the wind turbine sustainable energy generating system is installed or placed into a return chamber portion of the HVAC plenum.

18. The method of claim 11 including providing one or more vertically mounted wind turbine assemblies.

19. The method of claim 11 including providing one or more horizontally mounted wind turbine assemblies.

20. The method of claim 11 including mounting a stator to an interior surface of the plenum, the stator being in mechanical engagement with the transverse shaft of the wind turbine assembly.

* * * * *